US005521247A

United States Patent [19]

Döbler et al.

[11] Patent Number: 5,521,247

[45] Date of Patent: May 28, 1996

[54] AQUEOUS COATING AGENT, ITS MANUFACTURE AND USE FOR PRODUCING LAYERS OF FILLER

[75] Inventors: Klaus Döbler, Radeormwald; Michael Georgiadis, Wuppertal; Wolfgang Göldner, Heiligenhaus; Knut Gräf, Hattingen, all of Germany

[73] Assignee: Herberts G.m.b.H, Wuppertal, Germany

[21] Appl. No.: 175,087

[22] Filed: Dec. 29, 1993

Related U.S. Application Data

[63] Continuation of Ser. No. 993,571, Dec. 21, 1992, abandoned.

[30] Foreign Application Priority Data

Dec. 23, 1991 [DE] Germany .......................... 41 42 816.1

[51] Int. Cl.[6] ............................... C08J 3/00; C08K 3/20; C08L 51/00; C08L 75/00

[52] U.S. Cl. .......................... 524/591; 524/539; 524/839; 524/840; 524/871; 524/872; 524/874; 524/875

[58] Field of Search .................................... 524/539, 591, 524/839, 840, 871, 872, 874, 875

[56] References Cited

U.S. PATENT DOCUMENTS 4,147,679 4/1979 Scriven et al. .......................... 524/839

4,914,148 4/1990 Hille et al. ............................. 524/591

*Primary Examiner*—Paul R. Michl
*Assistant Examiner*—P. Niland
*Attorney, Agent, or Firm*—Richard A. Speer; Keck, Mahin & Cate

[57] ABSTRACT

Aqueous coating agent including a water-dilutable mixture of binding agents of

I. 50 to 88 wt. % of a neutralised water-soluble reaction product including
   (A) 10 to 80 wt. % of a polyurethane resin with an acid number of 70 to 160, at least one terminal blocked isocyanate group devoid of free hydroxyl groups and fatty acid residues with more than 12 C-atoms and with a limiting viscosity number of 6.5 to 12.0 ml/g, measured in DMF at 20° C., and
   (B) 20 to 90 wt. % of a polyester resin with an OH-number of 50 to 500, an acid number of less than 20, a limiting viscosity number of 8.0 to 13.0 ml/g, measured in DMF at 20° C., with the reaction product having a limiting viscosity number of 13.5 to 18.0 ml/g measured in DMF at 20° C.

II. 10 to 40 wt. % of one or several blocked polyisocyanates not capable of being diluted with water, and III. 2 to 30 wt. % of at least one amine resin by way of additional cross-linking agent.

17 Claims, No Drawings

AQUEOUS COATING AGENT, ITS MANUFACTURE AND USE FOR PRODUCING LAYERS OF FILLER

This is a continuation of application Ser. No. 07/993,571 filed on Dec. 21, 1992, now abandoned, the text of which is hereby incorporated by reference.

FIELD OF THE INVENTION

The invention relates to an aqueous coating agent suitable, in particular, for coating components in the motor car industry with a view to producing coatings resistant to the impact of stones and especially layers of filler resistant to the impact of stones.

BACKGROUND OF THE INVENTION

DE-OS 39 18 510 describes a process for producing coatings resistant to the impact of stones by the use of a conventional stoving filler based on a polyester and a specially blocked isocyanate.

In connection with ever more exacting requirements as regards protection of the environment, demands have been made for low-emission lacquer systems. This has led to the development of water-dilutable stoving fillers based on a wide variety of binding agents.

EP-A-249 727, for instance, describes a hydrofiller based on a combination of epoxide resin-phosphoric or phosphonic ester, a water-dilutable polyester according to AT-PS 328 587 and water-compatible melamine resins. DE-OS 40 00 748 describes hydrofillers based on water-dilutable hydroxy-functional polyurethane resins, optionally additional binding agents and water-compatible amine resins. DE-OS 38 13 866 describes hydrofillers consisting of water-dilutable polyurethane resin, water-dilutable epoxide resin-modified. polyester and optionally water-dilutable aminoplastic resin. DE-OS 38 05 629 describes a water-dilutable coating agent for producing coatings resistant to the impact of stones and based on carboxyl group-comprising polyesters or methacrylic copolymers and water-soluble blocked isocyanate prepolymers as well as optionally additional water-soluble amine resin.

All water-dilutable stoving fillers mentioned in the above specifications are, however, subject to the disadvantage that they cannot cope with all stresses due to the impact of stones such as occur in practice and do not therefore meet the criteria of the various test specifications applied by the various motor car manufacturers as regards resistance to the impact of stones. In particular, there are still in general deficiencies as regards the low-temperature resistance to the impact of stones, and the known water-based fillers are therefore still greatly in need of improvement. This is especially interesting in view of tendencies to change, as regards scattering materials applied during winter, from the conventional application of highway salt to increased application of grit or granulates.

Moreover, the known hydrofillers are not sufficiently resistant to overfiring, i.e. if the stoving temperatures appropriate to the system are exceeded, the characteristics of the layers of filler cease to be up to standard.

SUMMARY OF THE INVENTION

It is the object of the present invention to provide stable, water-dilutable stoving fillers enabling the production of coatings highly resistant to the impact of stones both at normal ambient temperatures and at low temperatures, e.g. up to −20° C. In addition, they are to be resistant to overfiring.

This object is surprisingly achieved by providing water-dilutable stoving fillers, the resin solids of which consist of I. 50 to 88 wt. % of a reaction product made soluble by complete or partial neutralisation with bases, said reaction product consisting of
   (A) 10 to 80 wt. %, but preferably 15 to 40 wt. %, of a polyurethane resin by way of polycarboxyl component, whereby said polyurethane resin contains carboxyl groups corresponding to an acid number of 70 to 160 mg KOH/g and at least one terminal blocked isocyanate group in the molecule, while being devoid of hydroxyl groups and fatty acid residues with more than 12 C-atoms and having a limiting viscosity number of 6.5 to 12.0 ml/g (see e.g. DIN 1342), but preferably 8.0 to 11.0 ml/g, measured in dimethyl formamide (DMF) at 20° C., as well as
   (B) 20 to 90 wt. %, but preferably 60 to 85 wt. %, of an optionally urethane-modified polyester resin by way of polyhydroxyl component with a hydroxyl number of 50 to 500 mg KOH/g, an acid number of less than 20 mg KOH/g and a limiting viscosity number of 8.0 to 13.0 ml/g, but preferably 9.5 to 12.0 ml/g, measured in DMF at 20° C., whereby the reaction product has a limiting viscosity number of 13.5 to 18.0 ml/g, but preferably 14.5 to 16.5 ml/g, measured in DMF at 20° C., II. 10 to 40 wt. % of one or several blocked polyisocyanate cross-linking agents not capable of dilution by water, and III. 2 to 30 wt. % of at least one amine resin, preferably selected from the group melamine and/or benzoguanamine resins by way of additional cross-linking agents, whereby each wt. % relates to the proportion of resin solids and each total of the percentages relating to the composition of the combination of (A) and (B) as well as (I), (II) and (III) amounts, in relation to the resin solids, to 100.

When manufacturing reaction product (I), component (A) and component (B) are reacted, without solvent or in organic solvents not capable of reacting with isocyanate groups, preferably at a temperature between 90° and 170° C., but in particular at a temperature which is 10° to 20° C. above the dissociation temperature of the blocking agent for the terminal isocyanate groups of component (A), up to a limiting viscosity number of 13.5 to 18.0 ml/g, but preferably 14.5 to 16.5 ml/g, measured in DMF at 20° C., without in this process going below the limit of solubility in water (i.e. the condensation product must remain capable of dilution in water).

Then the carboxyl groups of reaction product (I) are neutralised partly or completely with the aid of an inorganic or organic base, this being followed by mixing, preferably at 40° to 100° C., with the blocked polyisocyanate cross-linking agent or agents (II) not capable of dilution with water and dilution with water to a solids content suitable for further processing.

The additional cross-linking agent (III) may be added before or preferably after dilution with water or bringing about the dispersion of components (I) and (II).

Moreover, the aqueous stoving filler contains water by way of solvent, pigments, fillers and optionally additives as conventionally used in lacquer technology.

The invention also relates to the use of these water-dilutable fillers (primer surfacers) for motor car lacquering and to processes for producing coatings resistant to the impact of stones, in particular coatings resistant to the impact of stones at low temperatures.

The polyurethane resin used as polycarboxyl component (A) comprises, by way of specific initial compound (for its manufacture) one or several dihydroxy monocarboxylic acids and contains carboxyl groups corresponding to an acid number of 70 to 160 mg KOH/g as well as at least one terminal blocked isocyanate group per molecule. Moreover, polycarboxyl component (A) comprises, by definition, neither hydroxyl groups nor residues of fatty acids with more than 12 C-atoms. The blocking agent is split off at elevated temperature, i.e. at the reaction temperature for combining with polyhydroxyl component (B). Polycarboxyl component (A) can be diluted with water by itself, as can reaction product (I) combining (A) and (B), after partial or complete neutralisation of the carboxyl groups with the aid of a base, preferably a secondary or tertiary alkyl or alkanol amine.

The polyurethane resin is produced in known manner by reacting a mixture of one or several polyisocyanates with one or several polyisocyanates partly blocked by means of monohydroxyl compounds and/or oximes, e.g. butanone oxime, with the dihydroxy-monocarboxylic acid or dihydroxymonocarboxylic acids and optionally one or several polyols, the quantitative proportions being selected in such a way as to ensure that the molecule of polycarboxyl component (A) devoid of hydroxyl groups comprises on average at least one terminal blocked isocyanate group.

By way of dihydroxy-monocarboxylic acid use is preferably made of dimethylol propionic acid. In principle, other dihydroxy-monocarboxylic acids are also suitable.

By way of polyisocyanate compounds use is preferably made of the commercially available diisocyanates such as toluylene diisocyanate, isophorone diisocyanate or hexamethylene diisocyanate and optionally also of suitable isocyanate prepolymers.

In order to block the free NCO-groups one selects e.g. monohydroxyl compounds, in particular monoalcohols such as 2-ethylhexanol, monoethers of glycols and polyoxyalkylene diols or butanone oxime so as to ensure that they are split off, when reacting polycarboxyl component (A) with polyhydroxyl component (B), i.e. the dissociation temperature shall amount to between 80 and not more than 160° C. Polycarboxyl component (A) has a limiting viscosity number of 6.5 to 12.0 ml/g, but preferably 8.0 to 11.0 ml/g, measured in DMF at 20° C. (see e.g. DIN 1342).

By way of polyhydroxyl component (B) use is made of film-forming polyester resins characterised by a hydroxyl number of 50 to 500 mg KOH/g, an acid number of less than 20 mg KOH/g and a limiting viscosity number of 8.0 to 13.0 ml/g, but preferably 9.5 to 12.0 ml/g, measured in DMF at 20° C. The polyester resins produced from polyols and polycarboxylic acids may optionally comprise urethane groups and be modified with monocarboxylic acids comprising e.g. 5 to 20 C-atoms. Preferably however, the proportion of fatty acids shall not exceed 15 wt. %.

Components (A) and (B) are reacted at 90° to 170° C., but preferably at a temperature of 10° to 20° C. above the dissociation temperature of the blocking agent for the terminal isocyanate groups in polycarboxyl component (A), up to a limiting viscosity number of 13.5 to 18.0 ml/g, but preferably 14.5 to 16.5 ml/g, measured in DMF at 20° C., and in this connection it should be noted that after neutralisation of the carboxyl groups reaction product (I) must still be perfectly water-dilutable. The water-dilutability is influenced by the number of hydrophilic groups, especially the groups capable of being neutralised. The quantitative proportions are, with component (A), in the range of 10 to 80 wt. %, but preferably 15 to 40 wt. %, and with component (B), in the range of 20 to 90 wt. %, but preferably 60 to 85 wt. %, with reference to the solids, with the sum of the percentages adding up to 100 in every case, and the percentages are so selected as to ensure that reaction product (I) has an acid number of at least 25 mg KOH/g, but preferably between 30 and 50 mg KOH/g.

Directly before or after partial or complete neutralisation of the carboxyl groups with inorganic or organic bases but prior to the addition of a significant proportion of water, reaction product (I) is then mixed with cross-linking component (II), which by itself is not water-dilutable, and diluted with water to a solids content suitable for further processing.

By additional hydrolysis-stable linking of polycarboxyl component (A) with polyhydroxyl component (B) through the urethane group, by selecting specific raw materials for polycarboxyl component (A) with a view to improving the compatibility of reaction product (I) with blocked polyisocyanate or polyisocyanates (II) and by admixture of (II) prior to the addition of a significant proportion of water, the stability of the lacquers according to the invention, as formulated with the specified binding agent combinations, is considerably increased, a factor of particular importance for their use in industrial lacquering plant with ring-line systems.

By way of bases for neutralising the carboxyl groups of reaction product (I) use is preferably made of secondary or tertiary alkyl- or alkanolamines.

By way of cross-linking component (II), use may e.g. be made of commercially available blocked diisocyanates or blocked polyisocyanates preferably comprising small proportions of organic solvents and capable of being used as mixtures of several different components (II).

According to the invention use is made by way of cross-linking agents of type (III) aminoplastic resins such as melamine or benzoguanamine resins. The substances are e.g. conventional commercial products. They may be capable or not capable of dilution with water.

By way of benzoguanamine resins use is made e.g. of completely or partially alkylated methanol- and/or butanol-etherified derivatives, preferably of tetramethylol type.

By way of melamine resins use is made e.g. of methanol- and/or (iso)butanol etherified derivatives, preferably derived from hexamethylol melamine. Particularly preferred are water-soluble partly alkylated resins derived from hexamethylol melamine. Methanol is the preferred etherification alcohol.

Aminoplastic resins (III) are used by themselves or in mixture and according to the invention in quantitative proportions of 2–30 wt. %. The preferred quantitative proportion of (III) is in the region of 5–25, but preferably 8–16 wt. % of melamine and/or benzoguanamine resin.

It will be obvious to any expert that the quantity of component (III) in the finished hydrofiller may be adjusted to the quantity of component (II) present in the finished hydrofiller, i.e. the quantity of component (III) can be varied depending on the quantity of component (II) or its chemical structure as regards the proportion of latent isocyanate groups. In this connection the sum of (II) and (III) shall not exceed 50 wt. % with reference to the total proportion of binding agents.

A surprising feature of the invention consists in the fact that type (III) cross-linking agents not capable of dilution with water can be incorporated into the aqueous binding agent mixture by simple mixing.

The hydrofiller according to the invention may comprise conventional inorganic and/or organic fillers and/or pigments. Use may be made e.g. of fillers such as are conventionally used in the manufacture of filler coating agents.

DETAILED DESCRIPTION OF THE PREFERRED EMBODIMENTS

These may e.g. be inorganic pigments and fillers such as carbon black, titanium dioxide, finely dispersed silicon dioxide, aluminium silicate (e.g. kaolin), magnesium silicate (e.g. talcum), calcium carbonate (e.g. chalk), barium sulphate (e.g. baryte) and various pigments such as iron oxide pigments, organic pigments such as phthalocyanine pigments, organic fillers such as polyamide- or polyacrylonitrile powder, and anti-corrosion pigments such as lead- or chromate compounds.

By way of lacquer additives which may be used with hydrofillers according to the invention mention may be made of e.g. agents affecting the rheology of the compound, anti-settling agents, levelling agents, defoaming agents, deaeration agents, dispersing aids and catalysts. These substances serve for special adjustment of characteristics associated with lacquer or application technology. Optionally also adhesion-improving additives may be added to the coating agents, such as water-dilutable epoxide resin-modified alkyd resins or epoxide resin phosphoric esters.

By way of solvents use may be made of solvents as used conventionally in lacquer technology. The latter may result from the production of the binding agents. It is advantageous if the solvents are at least partly miscible with water. Examples of such solvents are glycol ethers, e.g. butylglycol, ethoxy propanol, butyl diglycol, diethylene glycol dimethyl ether, alcohols such as isopropanol, n-butanol, glycols such as ethylene glycol, N-methylpyrrolidone and ketones. Both the levelling characteristics and the viscosity of the coating agents can be influenced by the choice of solvents. The evaporation characteristics can be influenced by appropriate choice of the boiling point of the solvent used.

The pigments (fillers) and binding agents are used at a ratio by weight from e.g. 0.5:1 to 2.5:1, but preferably 0.8:1 to 1.8:1, depending on the pigment or filler combination. The coating agent solids are preferably in the range of 25 to 60 wt. % but preferably 30 to 55 wt. %. The solvent proportion may e.g. amount to as much as 15 wt. %, but preferably to up to 10 wt. %, in each case in relation to the aqueous coating agent.

It may be advantageous to adjust the coating agent by adding amines or amino alcohols, preferably secondary or tertiary alkyl or alkanol amines, to a pH value of 7.8–8.8. but preferably 8.2–8.4.

The aqueous stoving fillers according to the invention are e.g. produced by dispersing in a manner known to any expert, fillers or pigments, optionally with the addition of suitable dispersing aids and defoamers in a partial amount of the quantity of aqueous resin compound formed from (I) and (II) and present in the finished hydrofiller, making use of suitable dispersing units such as a pearl mill. Preferably, the particle diameters of the pigments and/or fillers shall be smaller than 15 μm.

This is followed by mixing with the remaining quantity of the aqueous resin compound consisting of (I) and (II), whereupon both component (III) and, subject to intensive mixing, other components still required in the finished aqueous stoving filler are optionally added.

Then the viscosity can be adjusted using water. The finished coating agent can be stored for a considerable time, without significant variations in viscosity or a tendency to settle. By adding water the viscosity can be adjusted to an appropriately low value so as to make it suitable for application, e.g. by spraying.

The coating agent is applied by rolling or spraying but preferably by spraying. Appropriate methods are compressed-air spraying, Airless spraying or ESTA-high rotation spraying. Car bodies or parts thereof which may consist of metal or plastic are particularly suitable as substrates. Metal components may be coated in conventional manner with an electrophoretically applied anti-corrosion primer or another conventional priming layer or intermediate layer. Such a layer is stoved e.g. at temperatures above 150° C. Examples of such appropriate anti-corrosion primers are described in DE-A-36 15 810, 36 28 121, 38 23 731, 39 20 214 and 39 40 782 as well as in EP-A-O 82 291, 209 857 and 234 395. Plastic substrates are preferably provided with adhesion-improving coating layers or with layers of primer based on two-component coating agents or physically drying coating agents. These coatings may optionally be subjected to mechanical operations such as grinding.

The coating agent according to the invention is applied to the precoated substrates. Following brief airing, optionally at elevated temperatures up to 80° C., the workpiece with the coating is stoved at temperatures between 130° and 190° C., but preferably more than 150° C. The thickness of the layer amounts to 15–120 μm, but preferably between 25 and 60 μm. After stoving, the surface can optionally be subjected to further treatment, e.g. by grinding, so as to produce a smooth surface without faults. The colouring and/or decorative lacquer, e.g. a unisurface lacquer or a base lacquer, but preferably an aqueous base lacquer, may be applied to said layer of filler.

The mechanical characteristics of the film can be influenced by the choice of aminoplastic resin (III). Resins of benzoguanamine type, for instance, produce filler coatings particularly resistant to the impact of stones at low temperatures, whereas with resins of melamine resin type the coatings will be particularly resistant to stone impact stresses such as multiple impacts of stones.

With aqueous fillers comprising the binding agents according to the invention it is possible to make use of larger proportions of the cross-linking components than with the products according to a state of the art. During storage of the lacquers no separation of the lacquer components is observed. Since it is possible to affect the reactivity of the lacquers to an increased extent by matching cross-linking agents (II) and (III) with one another, the intermediate-layer adhesion of the stoved films can optionally also be improved. In particular, the binding agent mixture according to the invention makes it possible to improve the resistance to overfiring, i.e. excessively long or intensive heating of the coating agent, as for instance when lacquering plants are inoperative.

The process according to the invention makes it possible to produce coloured or colourless aqueous coating agents which are opaque and suitable for the production of layers of filler resistant to overfiring and to the impact of stones (especially at low temperatures). In particular, the addition of different types and quantities of component (III) makes it possible to satisfy the different test specifications as regards resistance to the impact of stones by varying only this component of the coating agent.

With the process according to the invention optically smooth, multilayered coatings resistant to the impact of stones can be produced, whereby such coatings satisfy the most stringent requirements as regards production lacquering of motor cars.

The invention is illustrated in the following examples.

Production examples

A) Production of polycarboxyl component A

A solution of 945 parts (7 mol) dimethylol propionic acid in 1079 parts diethylene glycol dimethylether (DGM) and 599 parts methyl isobutylketone (MIBK) is prepared in a suitable reaction vessel. A mixture of 1,044 parts (6 mol) TDI and 528 parts (2 mol) of a TDI semi-blocked by means of ethylene glycol monoethyl ether is simultaneously added to this solution at 100° C. and over a period of 4 hours. Once all NCO-groups have been reacted, the compound is diluted with a mixture of DGM and MIBK (2:1) to a solids proportion of 60%. Component A has an acid number of 140 mg KOH/g and a limiting viscosity number of 10.2 ml/g, measured in N,N-dimethylformamide (DMF) at 20° C.

B) Production of polyhydroxyl component B 38 parts (0.2 mol) tripropylene glycol, 125 parts (1.2 mol) Neopentyl glycol, 28 parts (0.1 mol) isomerised linoleic acid, 83 parts (0.5 mol) isophthalic acid and 58 parts (0.3 mol) trimellithic anhydride are esterified in a suitable reaction vessel at 230° C. until the acid number is below 4 mg KOH/g. The viscosity of a 50% solution in ethylene glycol monobutyl ether according to DIN 53211/20° C. amounts to 165 seconds, and the limiting viscosity number is 10.5 ml/g measured in N,N-dimethylformamide at 20° C.

C) Production of binding agent component (I)

30 parts of component A and 70 parts of component B are while heating to the reaction temperature of 150°–160° C. under vacuum. The reaction takes place in approximately 90% solution in DGM. The temperature of 150°–160° C. is maintained until an acid number of 35–39 mg KOH/g and a limiting viscosity number of 16.0, measured in N,N-dimethylformamide at 20° C., have been reached, with a specimen being, after neutralisation with dimethyl ethanolamine, perfectly water dilutable.

D) Production of aqueous binding agent mixture I+II 65 parts of component (I) are mixed at 40°–100° C. with 35 parts of cross-linking component (II), commercially available polyisocyanate blocked with butanone oxime (trimeric hexamethylene diisocyanate with isocyanurate structure such as Desmodur N 3390, Bayer) and adjusted to a neutralisation degree of 90% using dimethyl ethanolamine. Then the mixture is diluted to a solids proportion of 40% with the aid of deionised water.

Reference example 1

Reference test A 0.7 parts carbon black, 1 part titanium dioxide, 18.3 parts barium sulphate and 2 parts talcum are stirred into 36 parts of the above aqueous binding agent mixture produced as above in D) and intensively mixed under the dissolver. This is followed by grinding this mixture intensively in a pearl mill and preparing the lacquer with 18 parts of the 40% aqueous composition produced in said example D) and 19.6 parts deionised water.

3 parts butyl glycol, 0.2 parts triethanolamine, 0.2 parts of a polyether-modified dimethyl polysiloxane copolymer (conventional commercial levelling additive) and 1 part of a 10% solution of a polysiloxane copolymer (conventional commercial defoamer) are added under the dissolver and mixed intensively.

Production of aqueous stoving fillers according to the invention

Example 1

The procedure is the same as in reference test A, the only difference being that instead of 19.6 parts deionised water only 17.1 parts deionised water are used, adding another 2.5 parts of an 85% aqueous solution of a partly methanol etherified melamine resin (polymerisation degree 2.3) in the last stage under the dissolver.

Example 2

The procedure is the same as in example 1, the only difference being that instead of the 2.5 parts of said melamine resin use is made of 2.5 parts of an 80% butanolic solution of a butanol etherified benzoguanamine resin of tetramethylol type.

Example 3

The procedure is the same as in example 1 but instead of the 2.5 parts melamine resin mentioned in example 1, only 1.25 parts are introduced into the mixture together with 1.25 parts of the benzoguanamine resin mentioned in example 2.

The aqueous filler compositions described in reference test A and in examples 1 to 3 are adjusted with deionised water to the processing viscosity and sprayed on to steel panels for car bodies precoated with KTL (18 μm), as is usual in the sphere of motor car production lacquering, and pretreated in the usual manner.

After airing for 5 minutes stoving proceeded at 160° C. for a period of 20 minutes. This was followed in each case by applying a conventional single layer surface coating suitable for motor car production lacquering to a dry-layer thickness of 40 μm, whereupon the system was stoved for 30 minutes at 130° C.

The same lacquer systems were produced in entirely the same manner in a second test series, but the layer of filler was now stoved for 30 minutes at 190° C. The aqueous fillers proved to be resistant to overfiring, for in each of the two test series multilayered coatings were produced with the characteristics listed in the following table:

| Specimen filler | Reference test A | 1 | 2 | 3 |
|---|---|---|---|---|
| Thickness of filler layer | 35 μm | 36 μm | 35 μm | 37 μm |
| Impact of stones acc. to VDA[1)] | | | | |
| adhesion of surface coating | 3 | 1 | 2–3 | 2 |
| perforations | 3 | 1 | 2–3 | 2 |
| Impact of stones acc. to "SPLITT-method"[2)] | | | | |
| Loss of adhesion | | | | |
| +20° C. | 10 $mm^2$ B/KTL | — | 6 $mm^2$ F/Dl | 8 $mm^2$ F/Dl |

-continued

| Specimen filler | Reference test A | 1 | 2 | 3 |
|---|---|---|---|---|
| −20° C. | 12 mm² B/KTL | — | 6 mm² F/DI | 8 mm² B/KTL |
| Impact of stones acc. to "SPLITT-method"[3) ] | | | | |
| Loss of adhesion | | | | |
| +20° C. | 8 mm² B/KTL | — | 4 mm² F/DI | 7 mm² F/DI |
| −20° C. | 10 mm² B/KTL | — | 4 mm² F/DI | 7 mm² B/KTL |

[1)]Testing by means of VDA stone impact tester (Messrs. Erichsen, Modell 508) at +20° C. using 1 kg steel shot (with sharp edges 4–5 mm), accelerated by 3 bar compressed air.
Assessment:
adhesion of surface coating (0 = no separation from filler, 10 = complete separation)
perforations (0 = no perforation, 10 = very many perforations)
[2)]Testing by means of stone impact simulator as described in "Farbe und Lack" 8/1984, pages 646–653.
Test specimen: cone with spherical tip with 2 mm diameter and a mass of 0.5 g
Impact angle: 5 degrees
Impact velocity: 180 km/h
Test temperatures: +20 and −20° C.
The largely circular damaged areas are indicated in mm² as is the point in the coating system where the adhesion failed (B = panel, KTL, F = filler, D1 = surface lacquer)
[3]Test as described in [2]
Test specimen: Ball with a mass of 0.15 g and a diameter of 2 mm
Impact angle: 5 degrees
Impact velocity: 280 km/h The limiting viscosity numbers in this specification correspond to the Staudinger Index (Limiting Viscosity Number), as defined e.g. in DIN 1342.

KTL, referred to in the above examples is an abbreviation for "cathodic electrodeposition".

What is claimed is:

1. Aqueous coating agent containing a water-dilutable mixture of binding agents consisting of I. 50 to 88 wt. % of a reaction product made water-soluble by complete or partial neutralization with bases, which reaction product is obtained by reacting either in the absence of water or solvent capable of reacting with isocyanate groups, or in the presence of organic solvents not capable of reacting with isocyanate groups, whereby said reaction product comprises the product of reacting:

A. 10 to 80 wt. % of a polyurethane resin as polycarboxyl component with an acid number of 70 to 160 mg KOH/g and at least one terminal blocked isocyanate group per molecule, said polyurethane resin being devoid of free hydroxyl groups and fatty acid residues with more than 12 C-atoms and having a limiting viscosity number of 6.5 to 12.0 ml/g, measured in dimethyl formamide (DMF) at 20° C., and B. 20 to 90 wt. % of an optionally urethane-modified polyester resin as polyhydroxyl component with an OH-number of 50 to 500 mg KOH/g, an acid number of less than 20 mg KOH/g, and a limiting viscosity number of 8.0 to 13.0 ml/g, measured in DMF at 20° C., whereby the reaction product I has a limiting viscosity number from 13.5 to 18.0 ml/g, measured in DMF at 20° C., II. 10 to 40 wt. % of one or several blocked polyisocyanates not capable of dilution in water as cross-linking agents, and III. 2 to 30 wt. % of at least one amine resin as additional cross-linking agent, with each wt. % relating to the resin solids.

2. Coating agent according to claim 1, characterised in that 15–40 wt. % of component (A) are reacted with 5–60 wt. % of component (B) to product (I).

3. Coating agent according to claim 1, characterised in that reaction product (I) has a limiting viscosity number of 14.5–16.5 ml/g.

4. Coating agent according to claim 1, characterised in that cross-linking agent (III) consists of one or several melamine resins.

5. Coating agent according to claim 4, characterised in that the melamine resins are partially alkylated hexamethylol melamine resins.

6. Coating agent according to claim 4, characterised in that the melamine resins are partially alkylated melamine resins.

7. Coating agent according to claim 1, characterised in that cross-linking agent (III) consists of one or several benzoguanamine resins.

8. Coating agent according to claim 7, characterised in that the benzoguanamine resins are at least partially alkylated tetramethylol benzoguanimine resins.

9. Coating agent according to claim 1, characterised in that 5–25 wt. % of cross-linking agent (III) are used.

10. Process for manufacturing a coating agent as defined in one of claims 1 to 9, comprising manufacturing the reaction product (I) by reacting component (A) with component (B) at a temperature of 10°–20° C. above the deblocking temperature of the blocked isocyanate group of (A).

11. Process according to claim 10, characterised in that cross-linking agent (III) is added to and mixed with components (I) and (II) prior to producing the dispersion phase.

12. Process according to claim 10, characterised in that cross-linking agent (III) is added in water-soluble or non-watersoluble form to an aqueous dispersion of components (I) and (II) and mixed with it.

13. Multilayer lacquering process, characterised in that a layer of filler consisting of a coating agent according to one of claims 1 to 9 is applied to a primed substrate and in that a layer of base or surface lacquer is applied after stoving.

14. Multilayer lacquering process according to claim 13, characterised in that the priming and/or lacquer layers next to the layer of filler are based on water-dilutable coating agents.

15. Multilayer lacquering process according to claim 13 comprising applying a coloured layer of filler.

16. A process for lacquering comprising applying coating agents as defined in one of claim 1 to 9 for producing layers of filler in multilayer lacquering systems.

17. A process according to claim 16 for lacquering motor vehicles.

* * * * *